United States Patent Office 3,349,642
Patented Oct. 31, 1967

3,349,642
VARIABLE SPEED TRANSMISSION
Richard E. Alsch, Lannon, Wis., assignor to Graham Transmissions, Inc., Menomonee Falls, Wis., a corporation of Delaware
Filed Oct. 14, 1965, Ser. No. 495,886
7 Claims. (Cl. 74—796)

ABSTRACT OF THE DISCLOSURE

The inclined longitudinally tapered planetary rollers are rotatably supported in bearing blocks radially slidable in the drive spider to roll inside the non-rotatable encircling contact ring which is adjustable lengthwise with respect to the rollers to regulate the planetary action of the rollers. The ball-like end of each roller rolls inside an outer race while inner races hold the ball against the outer race. The rolling action of the balls about their own axes and the axis of the outer races drives the outer race which is carried by and drives the driven shaft.

Transmission of this general character are well known in the art and have generally required the use of ball bearing supports for the planetary rollers along with planetary gears carried by the rollers and engaging the output gear secured to the output shaft. The design has had some objections. Since the ball bearing supports of the rollers are subjected to extremely high forces (sometimes running as high as 350 times the force of gravity) the bearing life is adversely affected. Furthemore, the gearing output is somewhat on the noisy side and, due to high speed operation coupled with the necessary bastardcut of the gears, does not have a long life expectancy. Finally, as the gearing wears the worn particles can lodge between the ring and rollers and cause excessive wear.

The present invention has for its principal purpose the improvement and simplification of transmissions of this type.

Another object is to eliminate all gearing in transmissions of the type described.

Still another object is to eliminate ball bearing supports for the rollers in transmissions of the type described.

Generally the prior transmissions of this type have allowed radial motion of the rollers in contact with the rings. This radial motion could be about the center point or pivot point of the bearing support for the roller or could be a sliding action of the roller along its inclined axis. In either case it changed the drive to the ring gear slightly.

Another object of this invention is to allow such radial motion of the rollers about the center point of planetary balls carried by the roller assembly to thereby substantially avoid dimensional changes in the drive or in forces acting on the drive elements.

Other objects and advantages will be pointed out in, or be apparent from, the specification and claims, as will obvious modifications of the single embodiment shown in the drawings, in which:

Figure 1:
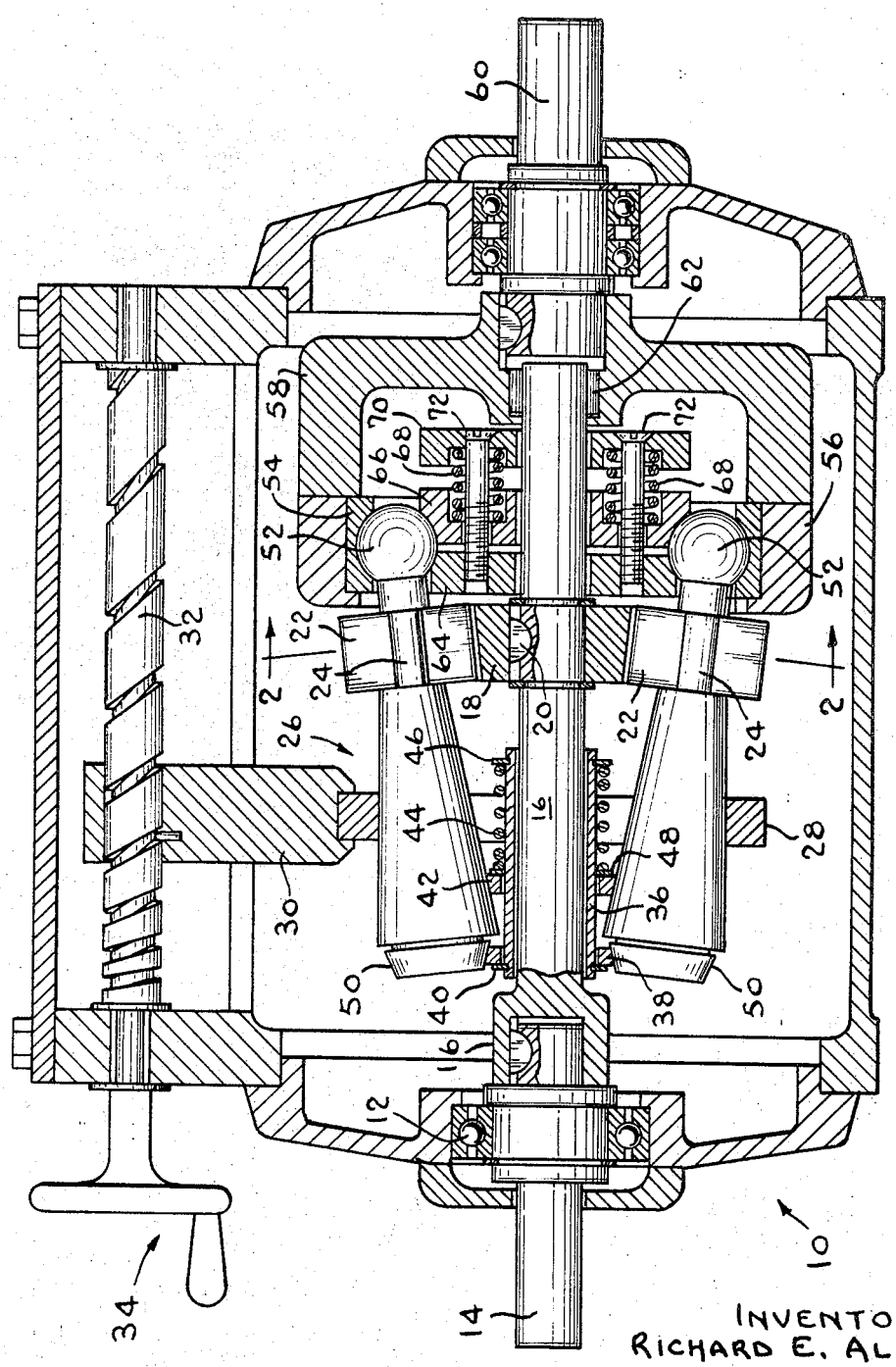
FIG. 1 is a vertical section through a transmission according to this invention.
Figure 2:
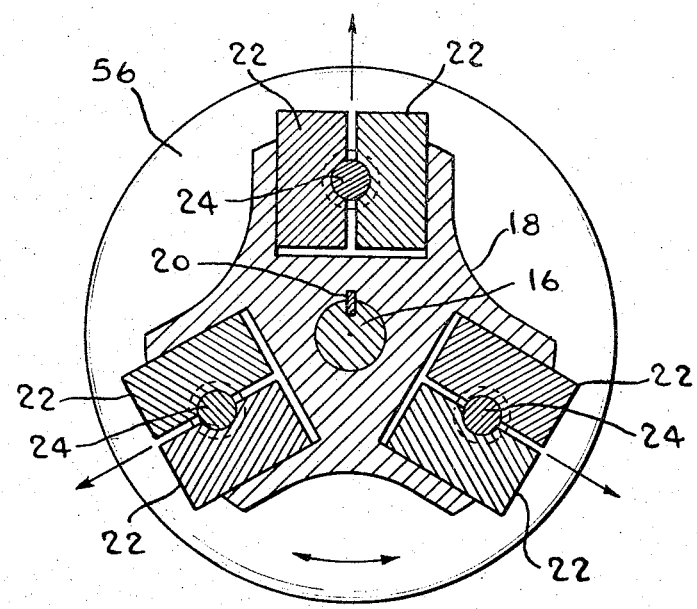
FIG. 2 is a vertical section taken as indicated by line 2—2 on FIG. 1 showing the spider and bearing block arrangement for supporting and driving the rollers.

The transmission is contained in a housing 10 having bearing 12 supporting stub shaft 14 which is keyed to the input shaft 16 but one shaft could be used if desired. The illustrated construction permits somewhat more versatility in adaption to standard motor shafts. The input shaft 16 has a spider 18 axially fixed thereon and connected thereto by means of key 20. The spider provides three radially disposed slots or grooves which support the split bearing blocks 22 which, in turn, support the cylindrical reduced diameter section 24 of the roller assemblies 26. It will be seen in FIG. 1 that the rollers are supported on an axis inclined at six degrees with respect to the axis of the input shaft 16. The rollers are tapered at six degrees so the outside of each roller is parallel to the shaft 16 and can run on the inside surface of ring 28 which is non-rotatably supported by yoke 30 carried and actuated by lead screw 32 supported in the upper part of the housing and actuatable by the handle 34 to adjust the ring axially of the rollers and hence, vary the output speed, as will be more fully explained hereinafter.

While it is not necessary that the rollers be preloaded into contact with the ring 28, the present construction does so preload the rollers to obtain greater torque at low speed.

Thus, the sleeve 36 is loosely fitted on the input shaft and has, at the left end, a tapered loading ring 38 seated against the snap ring 40 and at an intermediate position has another loading ring 42 of the same diameter as ring 38 acting against the roller 26. Compressed spring 44 seats against washer 46 at the right end and against washer 48 at the left so that its force is applied directly to the ring 42 and indirectly to ring 38 through the sleeve 36 whereby the two rings are equally loaded against the roller to urge it outwardly into contact with the ring 28 to augment centrifugal forces. As previously indicated, this construction is not necessary in all cases and frequently can be omitted. The specific preloading construction is shown and claimed in my copending application Ser. No. 323,428, now Patent No. 3,274,859.

As the input shaft is rotated, the spider will cause the rollers to rotate about the axis of the shaft 16 and by reason of the rolling contact with the fixed ring 28, the rollers will also rotate about their own axes and this motion in turn will, of course, reflect in rotation of the ball-shaped right end of the roller assembly. The balls 52 roll in outer race 54 fixed in carrier 56 connected to output member 58 which, in turn, is keyed to the output shaft 60 while, at the same time, supporting pilot bearings 62 for the right end of the input shaft 16. At the inside of the balls there are split races 64, 66 which are spring loaded towards one another to force the balls against the outer race. This spring loading is achieved by having the compressed spring 68 act against race half 66 on the one hand and against the seat formed in ring 70 which is connected to race half 64 by means of a plurality of screws 72 which pass freely through the right hand race half 66. The two race halves as well as the ring 70 all have clearance with respect to shaft 16. The force of spring 68 is selected to be greater than the slip forces which will appear at the ball if the output shaft 60 should stall. This forces the slip to occur between the rollers and the ring 28 rather than appearing at the races where damage could be done. As centrifugal force acts on the rollers, they will tend to swing outwardly about the center point of the ball 52 since this outward motion is permitted by the spider 18, while the spider, at the same time, prevents skewing action of the rollers tending to throw them out of purely radial motion. Thus the spider and the associated bearing blocks 22 both support and drive the roller assembly while at the same time restrain the swinging motion of the roller assembly to purely radial motion.

Figure 3:
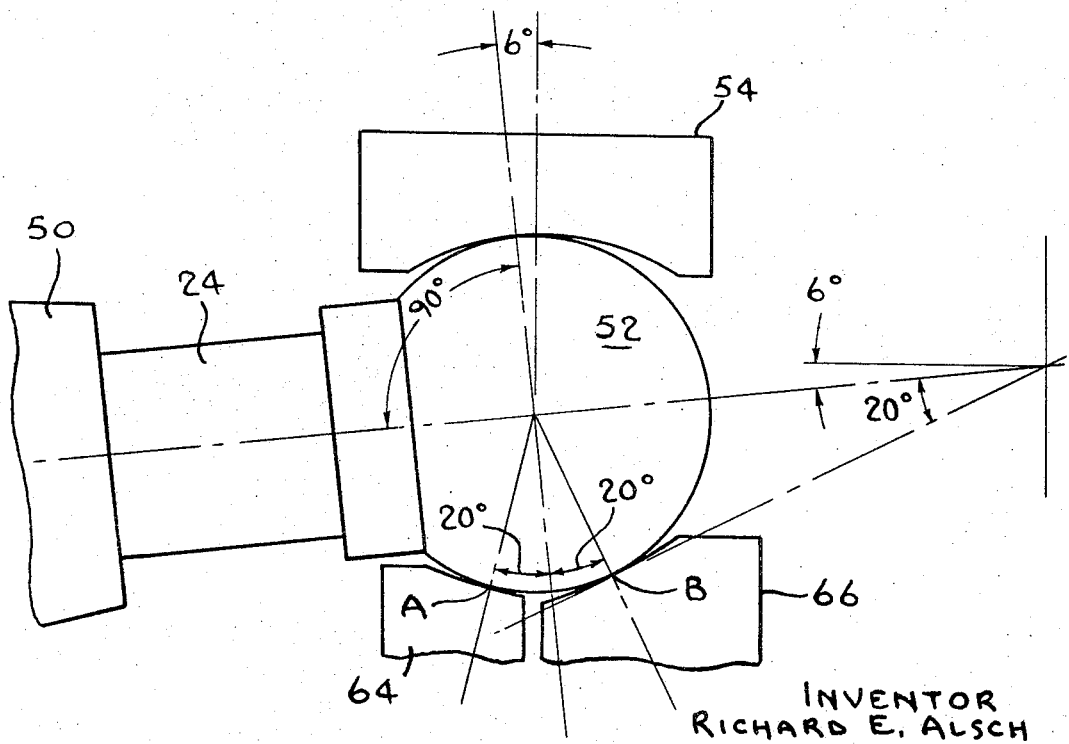
FIG. 3 is an enlarged detail showing the contact between the ball drive and the races.

FIG. 3 is an enlarged detail of the contact between the ball 52 and the races. It will be seen that the roller assembly is inclined at six degrees and therefore, the point of contact between the ball and race 54 is six degrees off vertical or off a plane normal to the axis of the transmission. It is in the plane normal to the roller axis. Due to this inclination and due to the spherical surfaces the points of contact between the ball 52 and races 64, 66 are also shifted six degrees but are equidistant from the plane normal to the roller axis and including the ball center. Therefore, there is no relative motion between the points A and B tending to skew the roller. The forces and points of contact on the ball are balanced and a long life is assured. The curvature of the races is slightly greater than the ball curve to achieve "line" contact.

Ignoring the motion imparted by the roller rotation about its owns axis, 1 r.p.m. in the clockwise direction (viewed from the left) at the input shaft will directly appear as 1 r.p.m. at the race 54 and the output shaft 60. Now taking the control ring diameter as 4 and setting it at the one inch diameter location on the roller it will be seen that 1 r.p.m. clockwise rotation of the input shaft forces the roller to roll counterclockwise at four times the input speed, or 4 r.p.m. This speed is superimposed on that previously indicated above and is transmitted to the outer race through the ball with the ball to race 54 having a four to one reduction. Therefore, the counterclockwise 4 r.p.m. of the roller is reduced to a counterclockwise 1 r.p.m. at the race and this is the opposite direction of the 1 r.p.m. transmitted directly to the race from the input shaft with the result that the net output speed is zero. As the control ring is moved towards the larger diameter it can be shown that the output speed can be increased over infinite steps until the maximum output speed of 1 r.p.m. is reached. If it is desired, the zero point of the drive could be moved along the roller to any desired point so that instead of having a range of 1 r.p.m. to zero, it would have say plus ½ down to zero and to minus ½. In all cases it will be appreciated that the 1 r.p.m. discussed can just as readily be 1800 r.p.m. or whatever input speed is selected.

If desired, the outer race 54 can be fixed and the output shaft driven from the inner race. This will give an output speed in a ratio of 2½ to 3½ times the input speed either as a reduction or as a step-up, depending upon which end is driven. Such an arrangement permits excellent selection of output speed within the speed range.

It will be seen that the output gearing of the art has been eliminated with a great decrease in noise and increased life. Sintered metal bearing blocks are used in place of ball bearings to avoid the problems in this area. The life has gone up greatly and noise has been reduced so much the only sound is the oil splashing in the housing. This has been achieved with a cost reduction in excess of 20%.

Although but a single embodiment of the present invention has been illustrated and described, it will be apparent to those skilled in the art that various changes and modifications may be made therein without departing from the spirit of the invention or from the scope of the appended claims.

What is claimed is:

1. A variable speed transmission comprising:
   an input shaft;
   a drive spider mounted on the shaft;
   a plurality of inclined planetary tapered rollers rotatably mounted in the spider for rotation about the shaft axis and their own axes;
   a non-rotatable control ring encircling and contacting the rollers;
   means for moving the ring axially of the rollers and shaft;
   a drive member fixed with respect to each roller and presenting spherical surfaces;
   a race engaged by the drive members and driven thereby as the drive member rolls with respect to the race; and
   a driven shaft connected to the race.

2. A transmission according to claim 1 in which said race is a ring type outer race presenting an inwardly facing race, and including a split inner race having two race halves contacting the drive members, and means urging the race halves towards each other to urge the drive member against the outer race.

3. A transmission according to claim 2 in which each roller is supported in bearing means and the spider is provided with radially disposed slots permitting outward movement of the rollers about the center of the spherical surfaces of the drive member.

4. A variable speed transmission comprising:
   a drive shaft;
   a non-rotatable axially moveable control ring concentric with the shaft;
   a plurality of inclined planetary drive members each having a tapered roller portion contacting the ring and a ball portion;
   inner and outer races engaging the ball portions;
   a driven shaft connected to one of the races to be driven thereby as the ball portions roll in the races;
   a spider connected to the drive shaft;
   bearings carried by the spider and supporting the drive members;
   said spider allowing radial movement of each drive member about the center of the ball portion.

5. A variable speed transmission according to claim 4 in which the curvature of the races is slightly greater than the curvature of the ball portions and the inner race is a split race, the two halves of which are biased towards each other by a spring.

6. A transmission according to claim 5 in which the spring force is great enough to prevent slippage between the ball portions and the races when a stalling load is applied to the output shaft whereby the slippage will occur between the roller portions and the ring.

7. A variable speed transmission comprising:
   An input shaft;
   a non-rotatable control ring concentric with the shaft;
   means moving the ring axially;
   a plurality of inclined planetary drive members each including a tapered roller contacting the ring and a ball;
   a spider driven by the shaft;
   bearings supported by the spider for radial movement and supporting the drive members;
   an outer race engaged and driven by the balls;
   a split inner race engaging the balls;
   spring means urging the halves of the split inner race towards each other; and
   an output shaft connected to and driven by the outer race.

References Cited

UNITED STATES PATENTS

| 2,196,292 | 4/1940 | Coughlin | 74—796 |
| 2,991,634 | 7/1961 | Daley, Jr. | 64—21 |

MILTON KAUFMAN, *Primary Examiner.*

FRED C. MATTERN, *Examiner.*

J. A. WONG, *Assistant Examiner.*